United States Patent
Hirota (10) Patent No.: US 11,149,784 B2
(45) Date of Patent: Oct. 19, 2021

(54) DUST COVER

(71) Applicant: NOK CORPORATION, Tokyo (JP)

(72) Inventor: Takuma Hirota, Shizuoka (JP)

(73) Assignee: NOK CORPORATION

( * ) Notice: Subject to any disclaimer, the term of this patent is extended or adjusted under 35 U.S.C. 154(b) by 332 days.

(21) Appl. No.: 16/124,822

(22) Filed: Sep. 7, 2018

(65) Prior Publication Data

US 2019/0078612 A1 Mar. 14, 2019

(30) Foreign Application Priority Data

Sep. 8, 2017 (JP) .............................. JP2017-173309

(51) Int. Cl.
*F16C 11/06* (2006.01)

(52) U.S. Cl.
CPC ...... *F16C 11/0671* (2013.01); *F16C 11/0604* (2013.01); *F16C 11/0619* (2013.01); *F16C 2240/40* (2013.01)

(58) Field of Classification Search
CPC .............. F16C 11/0666; F16C 11/0671; F16C 2240/40; F16J 3/02; F16J 15/525; Y10T 403/31; Y10T 403/315; Y10T 403/32729
See application file for complete search history.

(56) References Cited

U.S. PATENT DOCUMENTS

| | | | | |
|---|---|---|---|---|
| 4,852,891 A | * | 8/1989 | Sugiura | B29C 49/063 277/636 |
| 9,133,931 B2 | | 9/2015 | Kuroda et al. | |
| 2004/0165941 A1 | * | 8/2004 | Yokota | B21J 9/025 403/135 |
| 2009/0047063 A1 | * | 2/2009 | Shirai | F16C 11/0671 403/133 |
| 2013/0033016 A1 | | 2/2013 | Kuroda et al. | |
| 2014/0079465 A1 | * | 3/2014 | Idies | F16C 11/06 403/134 |
| 2018/0347621 A1 | * | 12/2018 | Hirota | F16J 15/52 |
| 2019/0078612 A1 | * | 3/2019 | Hirota | F16C 11/0671 |

FOREIGN PATENT DOCUMENTS

| | | |
|---|---|---|
| CN | 103375481 A | 10/2013 |
| CN | 204921992 U | 12/2015 |
| CN | 205053886 U | 3/2016 |

(Continued)

OTHER PUBLICATIONS

Translation of WO 2006/098124. Shirai, et al. Ball Joint. Sep. 21, 2006.*

(Continued)

*Primary Examiner* — Amber R Anderson
*Assistant Examiner* — Zachary A Hall
(74) *Attorney, Agent, or Firm* — Harness, Dickey & Pierce, P.L.C.

(57) ABSTRACT

A dust cover for a ball joint includes a seal structure on a small-diameter opening section that prevents dust lip lift off during compression. The seal structure includes a seal lip and a dust lip that elastically abut against a seal surface located between a knuckle and a stud of the ball joint. The dust lip has an axial length in contact with a sloping part of the seal surface of 0.5 mm to 1.0 mm. Further, a tip of the dust lip is axially spaced apart from a tip of the seal lip by 0.5 mm to 1.2 mm.

20 Claims, 8 Drawing Sheets

(56) References Cited

FOREIGN PATENT DOCUMENTS

| CN | 205877197 U | 1/2017 | |
|---|---|---|---|
| DE | 4112791 C1 * | 7/1992 | |
| DE | 19546233 A1 * | 6/1996 | .......... F16C 11/0638 |
| DE | 20-2017-101822 U1 | 5/2017 | |
| DE | 102015221046 A1 * | 5/2017 | ............ F16C 11/086 |
| DE | 102016207956 A1 * | 11/2017 | ............... F16J 3/042 |
| EP | 1662158 A1 * | 5/2006 | .......... F16C 11/0671 |
| JP | 2011-226595 A | 11/2011 | |
| WO | WO-2006-098124 A1 | 9/2006 | |
| WO | WO-2006098124 A1 * | 9/2006 | .......... F16C 11/0604 |
| WO | WO-2011132483 A1 * | 10/2011 | ............... F16J 3/042 |
| WO | WO-2014057779 A1 * | 4/2014 | .......... F16C 11/0619 |
| WO | WO-2015174329 A1 * | 11/2015 | ............... F16J 3/042 |
| WO | WO-2016063832 A1 * | 4/2016 | .......... F16C 11/0671 |
| WO | WO-2017-018168 A1 | 2/2017 | |
| WO | WO-2017-086142 A1 | 5/2017 | |
| WO | WO-2019063182 A1 * | 4/2019 | .......... F16C 11/0671 |

OTHER PUBLICATIONS

Translation of WO 2011/132483. Kuroda S, et al. Stud Ball, Dust Cover, and Stabilizer Connecting Rod. Oct. 27, 2011.*
Japanese Office Action for corresponding Application No. 2017-173309 dated Jul. 7, 2021 with English translation (6 pages).

* cited by examiner

Prior Art

FIG. 7

Prior Art

FIG. 8  Prior Art

DUST COVER

CROSS-REFERENCE TO RELATED APPLICATIONS

The present application is based on and claims the benefit of priority of Japanese Patent Application 2017-173309 filed on Sep. 8, 2017, the entire contents of which are incorporated herein by reference.

BACKGROUND OF THE INVENTION

Field of Invention

The present invention relates to a dust cover used with a ball joint.

Description of the Related Art

WO/2006/098124 describes a known ball joint provided with a dust cover.

Figure 5:
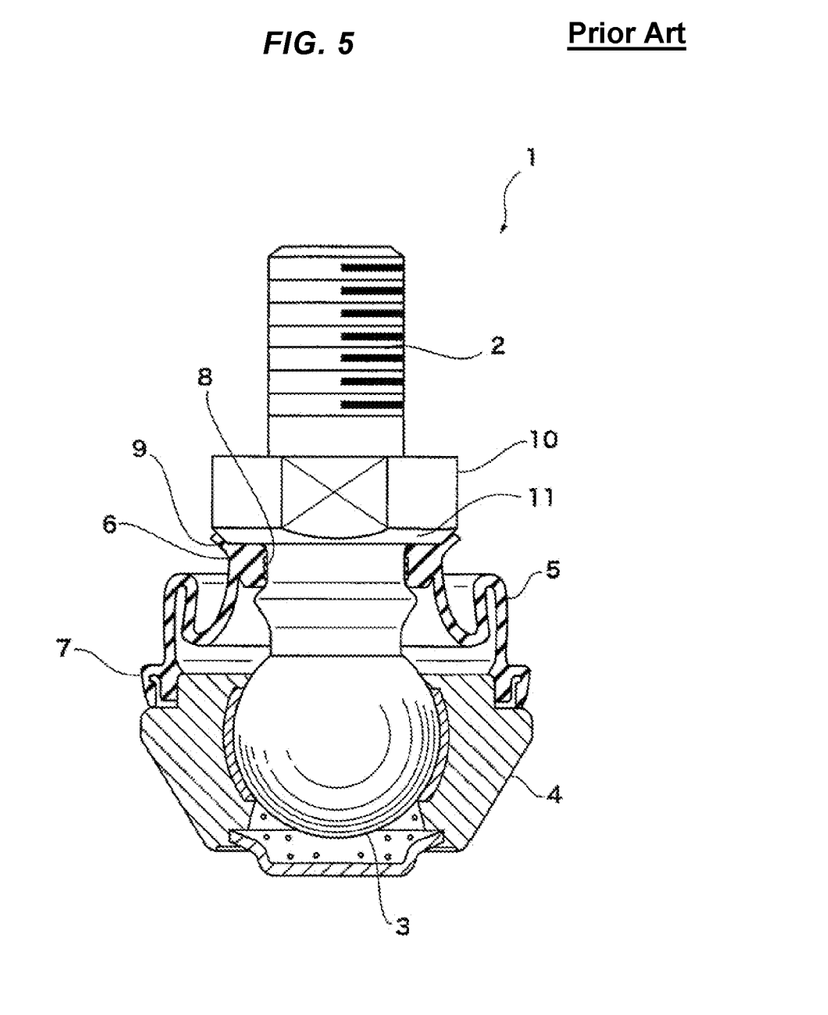
FIG. 5 is a longitudinal sectional front view illustrating an example of a conventional ball joint.

FIG. 5 is a longitudinal sectional front view of a ball joint 1 illustrated in FIG. 1 of WO/2006/098124. In the ball joint 1, a spherical head section 3 provided on a ball stud 2 is pivotably and rotatably held by a socket 4. The holding area is hermetically sealed by a dust cover 5.

The dust cover 5 is a film-like member having a small-diameter opening section 6 and a large-diameter opening section 7. The dust cover 5 elastically covers the stud by a seal lip 8 and a dust lip 9 provided on the small-diameter opening section 6 and the accommodating area of the spherical head section 3 is fixedly surrounded by the large-diameter opening section 7, thus hermetically sealing the accommodating area.

In WO/2006/098124, the ball stud 2, the spherical head section 3, and the socket 4 are referred to as "the ball shank 1," "the ball section 11," and "the ball reception section 20," respectively, the dust cover 5 is referred to as "the boot seal 4," and the small-diameter opening section 6 and the large-diameter opening section 7 are referred to as "the seal section 42" and "the fixed section 41," respectively. The seal lip 8 is referred to as "the seal lips 34, 47" and the dust lip 9 is referred to as "the side lip 48."

Figure 6:
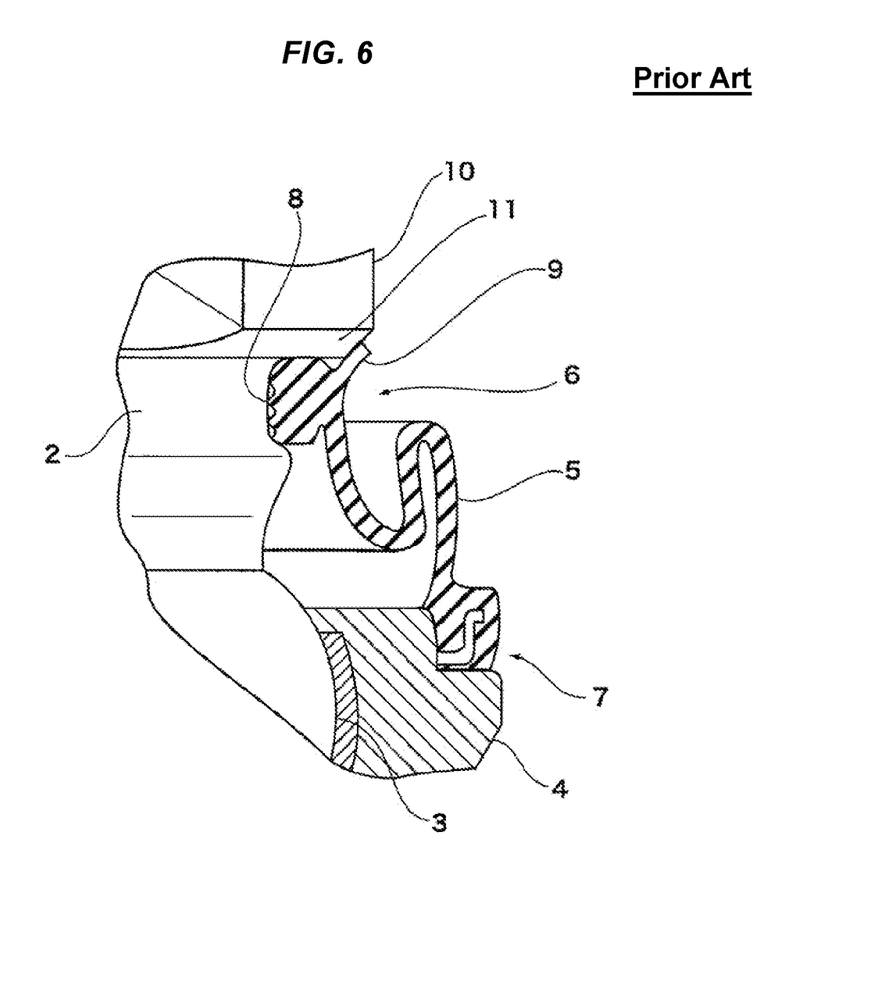
FIG. 6 is a longitudinal sectional enlarged front view illustrating a dust cover attached to the conventional ball joint in the example illustrated in FIG. 5.

FIG. 6 is a longitudinal sectional front view showing an enlarged portion of the dust cover 5. The ball stud 2 is provided with a knuckle 10 (corresponding to "the flanged section 13" in WO/2006/098124). The seal lip 8 elastically abuts against the outer peripheral surface of the ball stud 2 and the lower surface of the knuckle 10, thus creating a seal (refer to paragraph "0020" of WO/2006/098124).

The outer periphery of the knuckle 10 has a tapered sloping surface 11 (corresponding to "the tapered surface 16" in WO/2006/098124), and the dust lip 9 elastically abuts against the sloping surface 11 (refer to paragraph "0021" of WO/2006/098124).

The ball joint 1 seals in a lubricating grease, which is accommodated in the joint, by the seal lip 8 to prevent the leakage of the grease. The dust lip 9 prevents the infiltration of external foreign substances, such as water and dust, into the joint.

Figure 7:
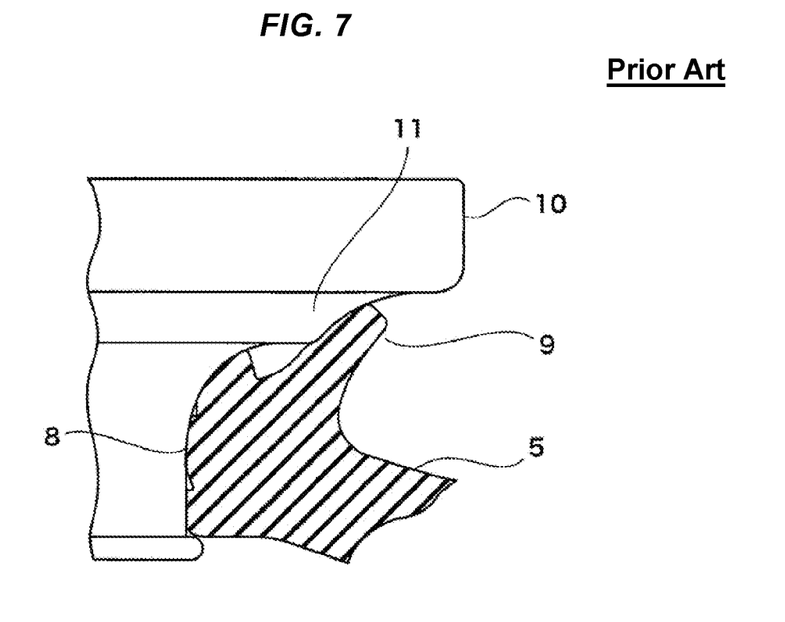
FIG. 7 is a longitudinal sectional enlarged front view illustrating a dust lip after a dust cover has been attached to another example of a conventional ball joint.

As illustrated in FIG. 7, the sloping surface 11, against which the dust lip 9 elastically abuts, may have a concavely curved shape as a variation.

The ball joint described in the foregoing WO/2006/098124 requires the following improvements.

A typical technical means for providing the seal between the knuckle and the dust lip is to press the dust lip against the lower surface of the knuckle and a contact pressure is applied to provide sealing. In the case where the outside diameter of the knuckle is small, a conventional method, in which the dust lip elastically abuts against the tapered sloping surface 11 illustrated in FIG. 6 (refer to "the tapered surface 16" in WO/2006/098124) or the sloping surface 11, which has the concavely curved shape as illustrated in FIG. 7, has been extensively used to provide sealing to thereby prevent the infiltration of external foreign substances, such as water and dust, into the joint.

Figure 8:
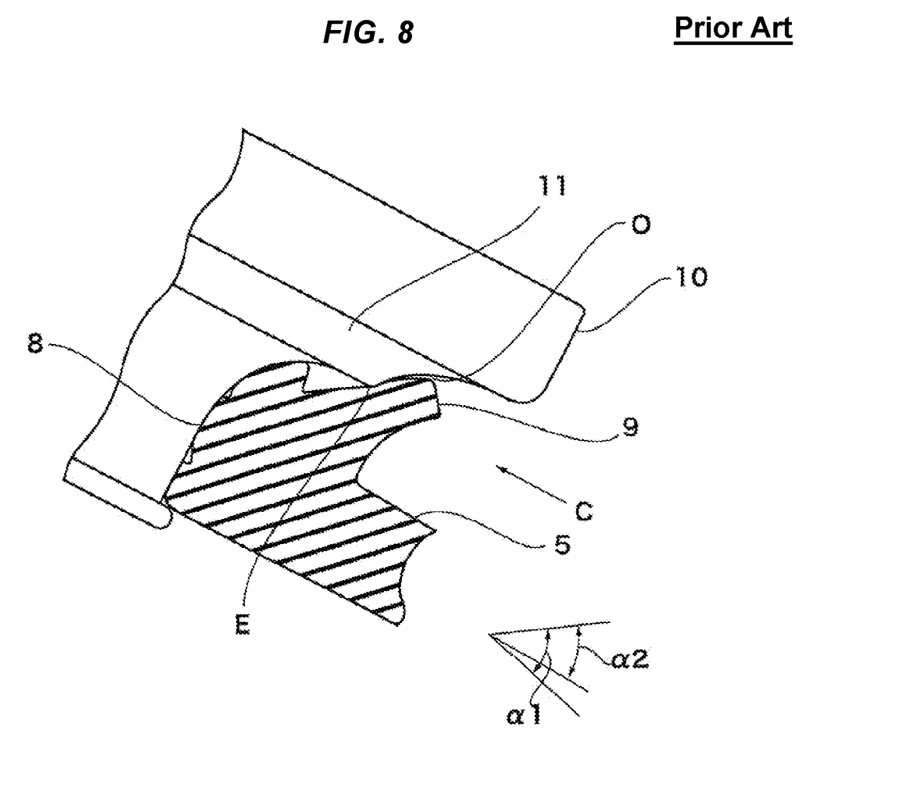
FIG. 8 is a longitudinal sectional enlarged front view illustrating the states of a seal lip and a dust lip when a ball stud has been pivoted in a direction in which the force of contact with the sloping surface of a knuckle is increased in the example of the conventional ball joint illustrated in FIG. 7.

In the case where the dust lip 9 elastically abuts against the sloping surface 11 that has a concavely curved shape as illustrated in FIG. 8, when the ball stud 2 pivots in the direction in which the contact force is increased, the distal end of the dust lip 9 tends to lift. This is a phenomenon in which the distal end portion of the dust lip 9 lifts relative to the sloping surface 11, which is to be sealed, thus producing a gap between the dust lip 9 and the sloping surface 11. In FIG. 8, the portion that has lifted is denoted by a reference symbol O.

The lifting of the distal end of the dust lip 9 is considered to occur due to the angle formed by the film-like portion of the dust cover 5 and the dust lip 9 being decreased from $\alpha1$ to E2 by the pivoting motion of the ball stud 2. As the angle decreases from $\alpha1$ to $\alpha2$, the dust lip 9 is pushed in the direction of the arrow C in FIG. 8, causing the position of contact with the corner E of the sloping surface 11 to be shifted to the distal end. When the position on the distal end side is shifted to the corner E, the dust lip 9 spreads and lifts.

The lifting of the distal end of the dust lip impairs the sealing performance of the dust lip, leading to a higher possibility of the infiltration of external foreign substances, such as water and dust, into the joint.

An object of the present invention is to maintain the sealing performance of a dust lip when a stud pivots.

SUMMARY OF THE INVENTION

One aspect of a dust lip in accordance with the present invention includes: a large-diameter opening section which encompasses an area accommodating a socket in which a spherical head section provided on one end of a stud of a ball joint is pivotably and rotatably accommodated; a small-diameter opening section which has a sloping surface having a diameter that decreases toward the spherical head section from a knuckle fixed to the other end of the stud and which encompasses a seal surface extending toward the spherical head section from the sloping surface; a seal lip provided on the small-diameter opening section such that the seal lip elastically abuts against a portion of the seal surface other than the sloping surface; and a dust lip which is provided on the small-diameter opening section such that the dust lip is disposed on an outer peripheral side closer to the knuckle than the seal lip and a side surface thereof elastically abuts against the sloping surface, and the length in an axial direction contacting the sloping surface in a state in which the dust cover has been attached to the seal surface is 0.5 mm to 1.0 mm.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

An embodiment will be described with reference to FIGS. 1 to 4 and discussed relative to FIG. 8. The embodiment illustrates an example of a ball joint 101 that connects a lower arm (not illustrated), which is an object to be jointed, and a knuckle 201.

Figure 1:
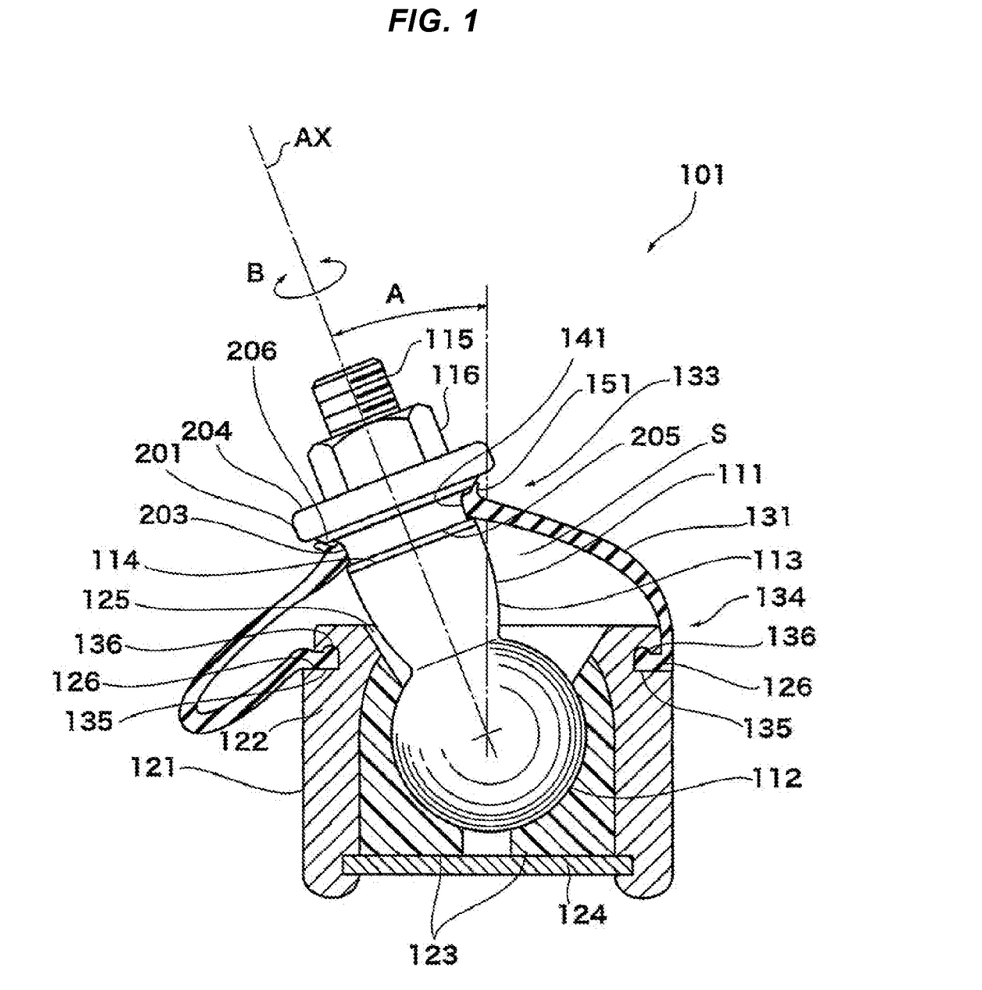
FIG. 1 is a longitudinal sectional front view of a ball joint illustrating an embodiment of the present invention.

As illustrated in FIG. 1, the ball joint 101 has a basic structure in which a spherical head 112 provided on a ball stud 111 is held by a socket 121 such that the spherical head 112 can pivot (arrow A) and rotate (arrow B), and the holding area is hermetically sealed by a dust cover 131.

The ball joint 101 connects part of a stud 113 of the ball stud 111 to the knuckle 201. The stud 113 extends from the spherical head 112, with the axis thereof passing through the central point of the spherical head 112, and has a step 114 at the middle thereof and a bolt 115 at the distal end thereof. The ball joint 101 is connected to the knuckle 201 by inserting the stud 113 into a mounting hole, which is not illustrated, provided in a central portion of the knuckle 201, and tightly screwing a nut 116 onto the bolt 115.

The knuckle 201 is fastened between the step 114, which is provided on the stud 113, and the nut 116, and extends in a direction that is orthogonal to an axis AX of the ball stud 111. Referring to FIG. 1, the knuckle 201 is shaped such that only the two edge portions thereof extend in the direction that is orthogonal to the axis AX of the ball stud 111, and the middle portion thereof covers the stud 113. The middle portion of the knuckle 201 serves as a seal surface 203 against which a seal lip 141 and a dust lip 151 of the dust cover 131 elastically abut, which will be discussed later. The seal surface 203 will also be described in detail later.

The socket 121 accommodates a bearing 123, which is made of a resin, in a cylindrical housing 122 having two open ends, and closes the bottom thereof by a bottom plate 124. One open end of the housing 122 forms an opening 125, the part of the stud 113 of the ball stud 111 being exposed to the outside through the opening 125. The bearing 123 is accommodated in the housing 122 with no clearance and fixedly held, and pivotably and rotatably holds the spherical head 112 of the ball stud 111. The area where the bearing 123 and the spherical head 112 are in contact is filled with lubricating grease.

The housing 122 has a mounting groove 126 formed in the outer peripheral surface thereof at a position adjacent to the opening 125. The mounting groove 126 is a groove for mounting the dust cover 131.

Figure 2:
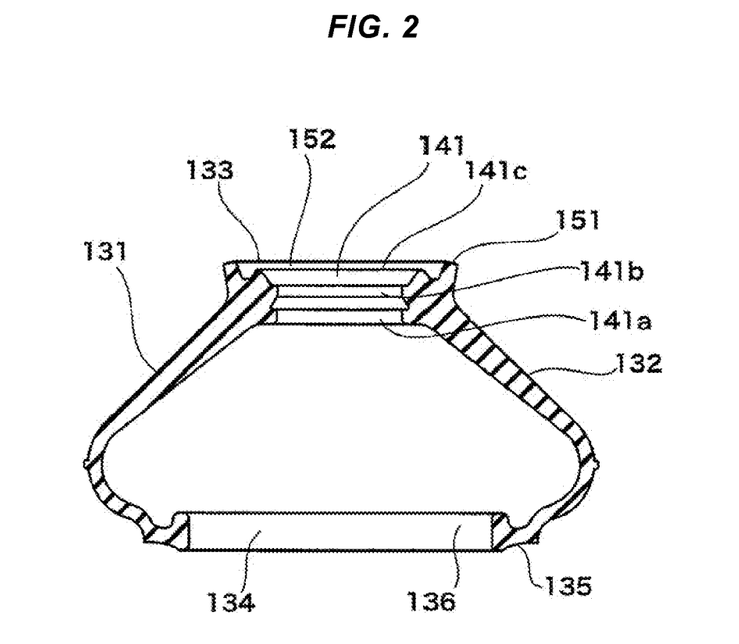
FIG. 2 is a longitudinal sectional front view of a dust cover.

As illustrated in FIG. 2, the dust cover 131 is a film-like member (e.g., a sheath) formed of a rubber-like elastic (e.g., elastomeric) member. The dust cover 131 is provided with a small-diameter opening section 133 at one end of a cup-shaped film 132 and a large-diameter opening section 134 at the other end thereof. Since the dust cover 131 is formed by the rubber-like elastic member, it exhibits flexibility and an elastic restoring force.

The large-diameter opening section 134 has a clamp 135 to be attached to the mounting groove 126 provided in the outer peripheral surface of the housing 122. The clamp 135 has a projection 136 which fits into the mounting groove 126 and which is provided on the inner peripheral surface of the large-diameter opening section 134. The large-diameter opening section 134 of the dust cover 131 is fixedly installed to the housing 122 of the socket 121 by fitting the projection 136 to the mounting groove 126.

The small-diameter opening section 133 includes the seal lip 141 and the dust lip 151. The seal lip 141 and the dust lip 151 are annularly formed into the dust cover 131 by integral molding. The seal lip 141 is located at the inner periphery and at the opening end of the small-diameter opening section 133, while the dust lip 151 is located at the opening end of the small-diameter opening section 133.

The seal lip 141 elastically abuts and covers the seal surface 203 of the knuckle 201 fixed to the stud 113 and hermetically seals a space S accommodating the spherical head 112 defined by the film 132 of the dust cover 131. The seal lip 141 is comprised of three ridges (e.g., annular ribs) 141a, 141b and 141c.

The two ridges 141a and 141b of the seal lip 141 are annularly and protrusively formed on the inner peripheral surface of the small-diameter opening section 133. The ridges 141a and 141b project radially inwardly from the inner periphery of the small-diameter opening section 133.

The remaining ridge 141c of the seal lip 141 is protrusively formed on the opening end of the small-diameter opening section 133. The ridge 141c projects axially from the small-diameter opening section 133.

The dust lip 151 is disposed further on the outer periphery side of the small-diameter opening section 133 than the seal lip 141. The dust lip 151 is elastically pressed against the seal surface 203 of the knuckle 201 to thereby hermetically seal the seal surface 203.

The dust lip 151 protrudes from the opening end of the small-diameter opening section 133. The dust lip 151 projects axially from the small-diameter opening section 133.

Figure 3:
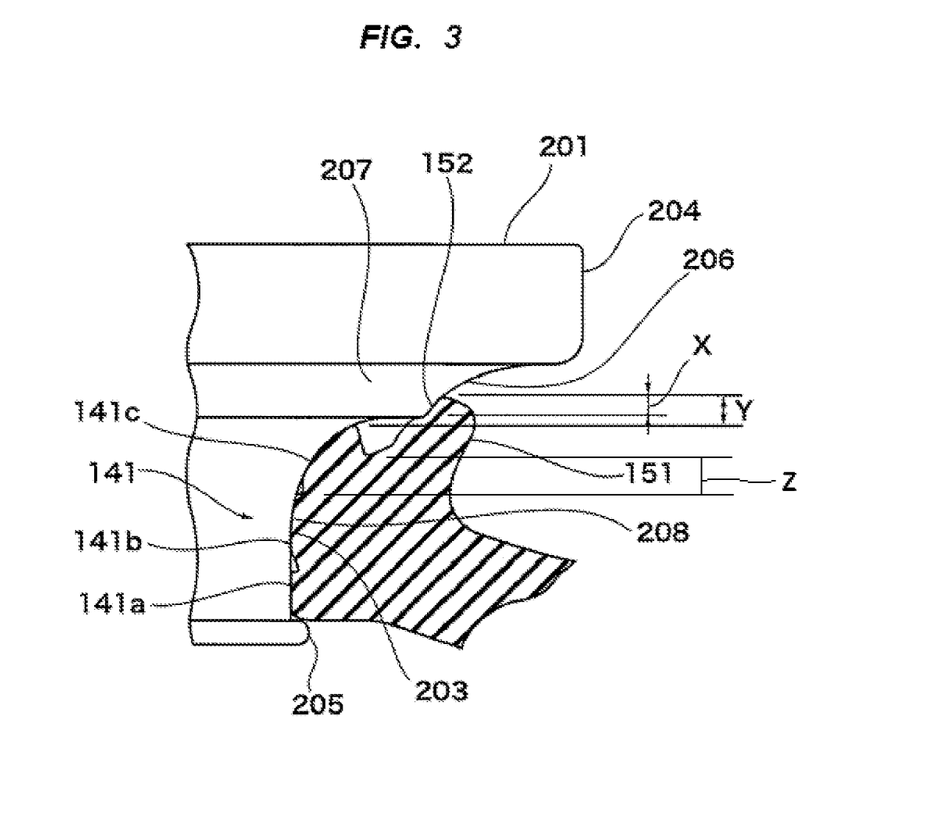
FIG. 3 is a longitudinal sectional enlarged front view of a seal lip and a dust lip after the dust cover has been attached to the ball joint.

As illustrated in FIG. 3, the seal surface 203 of the knuckle 201 is formed between both end portions extending orthogonally to the axis AX (refer to FIG. 1) of the ball stud 111. The upper end portion of the knuckle 201 is a knuckle body 204 that forms the main body of the knuckle. The lower end portion of the knuckle 201 is a flange 205 for preventing the small-diameter opening section 133 of the dust cover 131 (refer to FIG. 2) from slipping off. The seal surface 203 rises along the axial direction of the stud 113 (refer to FIG. 1) from the flange 205 and the upper portion thereof spreads (e.g., flares) toward the outer periphery, thus forming a sloping surface 206 that continues to the knuckle body 204.

More specifically, the knuckle 201 has a large-diameter collar 207 that includes the sloping surface 206 of the seal surface 203, and a small-diameter collar 208 that forms the remainder of the seal surface 203. The small-diameter collar 208 having a smaller diameter than the large-diameter collar 207 gradually spreads in a curved shape and continues to the large-diameter collar 207. In other words, the small-diameter collar 208 has a portion (a radiused face) that continues to the sloping surface 206 and has a concavely curved sectional shape and a portion (cylindrical face) that extends straight toward the spherical head 112 from the curved portion. The portion that extends straight is parallel to the axis AX. A portion of the small-diameter collar 208 that reaches a maximum diameter is still smaller than the diameter of the large-diameter collar 207.

As described above, the sloping surface 206 (sloped face) formed on the outer peripheral surface of the large-diameter collar 207 spreads toward the outer periphery in the upper portion thereof in FIG. 3. In other words, the diameter of the sloping surface 206 reduces toward the spherical head 112. The sloping surface 206 has a concavely curved sectional shape.

When the dust cover 131 is attached in the ball joint 101, the seal lip 141 and the dust lip 151 provided on the small-diameter opening section 133 elastically abut against the seal surface 203 of the knuckle 201.

The seal lip 141 elastically abuts against the seal surface 203 along the small-diameter collar 208 and is in a compressed state. The two ridges 141a and 141b of the seal lip 141 described above press against the cylindrical face of the seal surface 203 which is parallel to the axis AX of the ball stud 111, i.e. the portion that extends straight toward the spherical head 112 from the curved portion. The ridge 141c of the seal lip 141 presses against the radiused face of the seal surface 203 which has the curved shape, i.e. the portion which continues to the sloping surface 206 and which has a concavely curved sectional shape.

At this time, the two ridges 141a and 141b are compressed by a reaction force applied from the direction that is orthogonal to the axis AX, and the ridge 141c is compressed by a reaction force applied from a direction at an acute angle with respect to the axis AX. More specifically, the upper edge of the ridge 141c extends into the area where the slope of the seal surface 203 starts, so that the upper edge is also compressed by being subjected to the reaction force applied from the direction at the acute angle with respect to the axis AX. Thus, the seal lip 141 forms a seal against the seal surface 203.

The dust lip 151 elastically abuts against the large-diameter section 207, i.e. elastically abuts against the sloping surface 206 of the seal surface 203. The dust lip 151 is elastically deformable such that the dust lip 151 pivots in the direction that is orthogonal to the extending direction thereof, one of the two surfaces that elastically deforms faces the sloping surface 206 and is referred to as a contact surface 152. At this time, the dust lip 151 elastically deforms by pressing the contact surface 152 against the sloping surface 206, and the sloping surface 206 is sealed by the restoring force. Thus, the dust lip 151 forms a seal against the sloping surface 206 of the seal surface 203.

The dust lip 151 has a specific length dimension in the direction of the axis AX with respect to the sloping surface 206 (hereinafter referred to also as "the contact width X") of 0.5 mm to 1.0 mm in a state in which the small-diameter opening section 133 of the dust cover 131 has been attached to the seal surface 203. The dust lip 151 also has a specific distance dimension closer in the direction of the axis AX than the ridge 141c of the seal lip 141 with respect to the knuckle 201, i.e. the length in the direction of the axis AX between the tip of the seal lip 141 and the tip of the dust lip 151 (hereinafter referred to also as "the height difference Y"), of 0.5 mm to 1.2 mm in the state in which the small-diameter opening section 133 of the dust cover 131 has been attached to the seal surface 203.

As illustrated in FIG. 3, the base of the seal lip 141 and the base of the dust lip 151 are spaced apart from each other by a spacing distance Z. The spacing distance Z is, for example, 1.6 mm or more.

The operation of the seal lip 141 is to seal the stud 113 through the intermediary of the knuckle 201 to prevent the leakage of the lubricating grease held in the space S, which is defined by the film 132 of the dust cover 131, i.e., inside the joint. The dust lip 151 seals the seal surface 203 of the knuckle 201 to prevent the infiltration of external foreign substances, such as water and dust, into the joint.

In an environment where the ball joint 101 is used, the angle formed between the lower arm, which is an object to be jointed and which is not illustrated, and the knuckle 201 changes. Accordingly, the spherical head 112 pivots (the arrow A in FIG. 1) and/or rotates (the arrow B) in the socket 121 to enable the ball stud 111 to pivot and/or rotate. A change in the angle formed between the two objects to be jointed is accommodated by the motion of the spherical head 112.

When the ball stud 111 pivots, the dust cover 131 deforms. The dust cover 131 is an elastomeric member and therefore exhibits flexibility and an elastic restoring force. The film 132 is stretched on the side of extension (on the right side in FIG. 1) caused by the pivot motion of the ball stud 111, whereas the film 132 is warped and contracted on the side of compression (on the left side in FIG. 1). The dust cover 131 accommodates the deformation caused by the pivoting motion of the ball stud 111.

Figure 4:
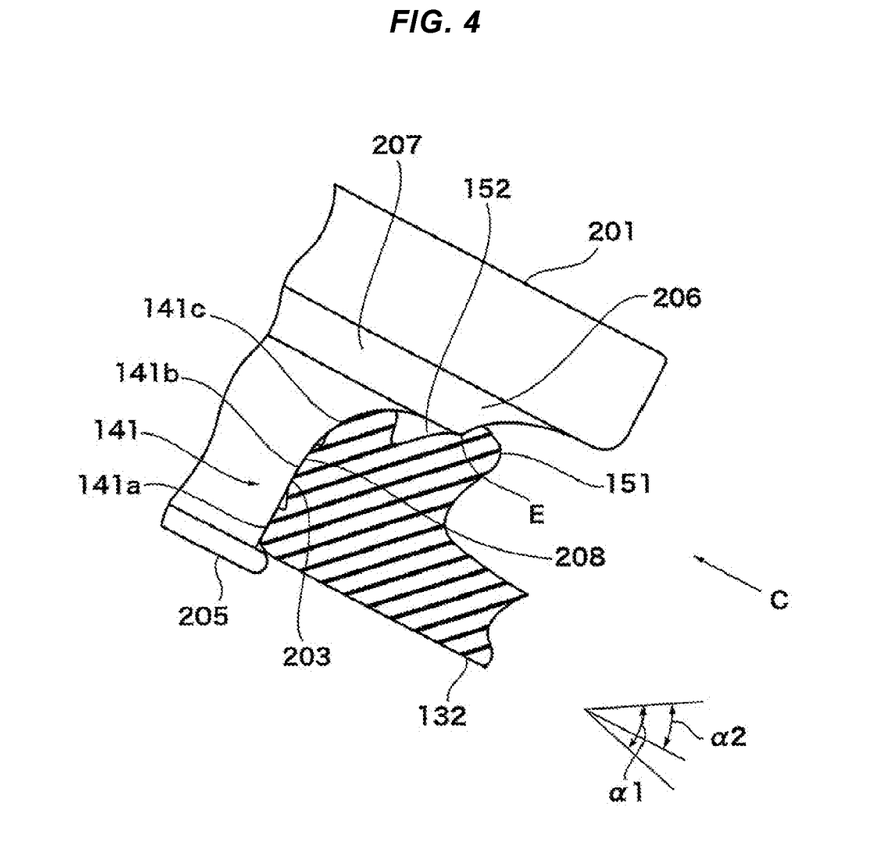
FIG. 4 is a longitudinal sectional enlarged front view illustrating the states of the seal lip and the dust lip when a ball stud has been pivoted in a direction in which the contact with a sloping surface of a knuckle is increased.

FIG. 4 is an enlarged longitudinal sectional front view illustrating the states of the seal lip 141 and the dust lip 151 on the compression side (corresponding to the left side in FIG. 1) when the ball stud 111 has pivoted. On the compression side, the seal lip 141 and the dust lip 151 increase the abutting force against the seal surface 203 provided on the knuckle 201.

At this time, in the seal lip 141, the ridges 141a, 141b and 141c are already in the compressed state and elastically abut against the seal surface 203, so that the increase in the force of contact poses no problem. This is simply because an additional force is applied in the direction for further compressing the ridges 141a, 141b and 141c.

The dust lip 151 in the state illustrated in FIG. 4 increases the contact force with respect to the contact surface 152 provided on one surface side in the pivot direction. At this time, the dust lip 151 is displaced in a falling direction (downward) due to a pressing force applied to the contact surface 152. If the dust lip 151 is excessively long, then the lifting phenomenon occurs at the distal end of the dust lip 151, as illustrated in FIG. 8. In the dust lip 151 of the present embodiment, however, the dimension of the contact width X in the direction of the axis AX with respect to the sloping surface 206 is 0.5 mm to 1.0 mm, and the dimension of the height difference Y between the seal lip 141 and the dust lip 151 is 0.5 mm to 1.2 mm, so that the lifting phenomenon at the distal end of the dust lip 151 can be prevented. This is because of the following reasons.

(1) Reason for Setting the Upper Limit Value of the Close Contact Width X to 1.0 mm As described above with reference to FIG. 8, the occurrence of lift at the distal end of the dust lip 151 is considered to be caused due to the decrease in the angle, which is formed between the film 132 of the dust cover 131 and the dust lip 151, from α1 to α2 as the stud 113 pivots. Referring to FIG. 4, as the angle decreases from α1 to α2, the dust lip 151 is pressed in the direction of arrow C, causing the position of contact with the corner E of the sloping surface 206 to be shifted toward the distal end. Therefore, the dust lip 151 is pressed in the spreading direction, thus causing the distal end to lift. The lifting phenomenon at the distal end of the dust lip 151 described above markedly occurs in the case where the sloping surface 206 has a concavely curved shape, as in the present embodiment.

However, as illustrated in FIG. 8, the lifting of the distal end of the dust lip 151 starts midway between the position of the corner E and the distal end of the dust lip 151 (refer to reference numeral "9" in FIG. 8) rather than sharply beginning from the position of the corner E. In the area from the corner E to the middle toward the distal end, the dust lip 151 elastically deforms and remains in contact with the sloping surface 206. The area in which the dust lip 151 elastically deforms thereby to abut against the sloping surface 206 extends for approximately 1.0 mm.

Hence, the lift occurring at the distal end of the dust lip 151 can be prevented by specifying the upper limit value of the dimension of the contact width X in the direction of the axis AX with respect to the sloping surface 206 as 1.0 mm.

(2) Reason for Setting the Lower Limit Value of the Close Contact Width X to 0.5 mm A question arises as to whether further shortening the contact width X would achieve even better results. In this respect, if the close contact width X is excessively small, then the dust lip 151 may come off of the sloping surface 206 when the dust lip 151 is pressed in the direction of the arrow C in FIG. 4, and the dust lip 151 would lose its intrinsic sealing function. The dimension of the contact width X that prevents the occurrence of such an event is 0.5 mm.

(3) Reason for Setting the Upper Limit Value of the Height Difference Y to 1.2 mm As described above, when the stud 113 pivots, the dust lip 151 remains in contact with the sloping surface 206 in the area in the middle from the corner E toward the distal end, and the area in which the contact state is maintained extends for approximately 1.0 mm. At this time, the length along which the dust lip 151 remains in contact with the sloping surface 206 depends on the height difference Y between the seal lip 141 and the dust lip 151. If the height difference Y becomes excessively large, then the length along which the dust lip 151 remains in contact with the sloping surface 206 decreases. To maintain a satisfactory state of contact of the dust lip 151 with the sloping surface 206, the height difference Y is desirably controlled to approximately 1.2 mm. This is the reason why the upper limit value of the height difference Y is set to 1.2 mm.

(4) Reason for Setting the Lower Limit Value of the Height Difference Y to 0.5 mm This dimension is a value matched to the lower limit value 0.5 mm of the contact width X. When the contact width X is 0.5 mm and the height difference Y is 0.5 mm, the seal lip 141 contacts the large-diameter section 207.

As described above, according to the present embodiment, even when the ball stud 111 pivots, the lifting phenomenon at the distal end of the dust lip 151, which tends to occur on the compression side, can be prevented, thus enabling the sealing performance of the dust lip 151 to be maintained. This makes it possible to securely prevent the infiltration of external foreign substances, such as water and dust, into the joint.

At the time of implementation, a wide variety of modifications and variations can be made.

For example, the shape of the sloping surface 206 against which the dust lip 151 is pressed to seal is not limited to a concavely curved shape, as in the present embodiment, but may alternatively be a flat tapered surface (frusto-conical surface).

The seal lip 141 illustrated in the present embodiment is configured to elastically abut against the seal surface 203 of the knuckle 201 mounted on the stud 113 to seal the stud 113. At the time of implementation, the seal lip 141 may alternatively be configured to be directly in contact with the stud 113.

Numerous modifications and variations of the present invention are possible in light of the above teachings. It is therefore to be understood that, within the scope of the appended claims, the invention may be practiced other than as specifically described herein.

What is claimed is:

1. A ball joint comprising:
   a socket;
   a stud having a spherical head, the spherical head being couple to the socket;
   a knuckle attached to the stud, the knuckle having a seal surface and a sloping surface having a first end proximate the seal surface, an opposite second end distal from the seal surface, and a midpoint between the first end and the second end; and
   a dust cover including:
      a cup-shaped elastomeric film;
      a large-diameter opening section at a ball end of the film that is coupled to the socket;
      a small-diameter opening section at a stud end of the film, the small-diameter opening section encompassing the seal surface;
      a seal lip provided on the small-diameter opening section, the seal lip elastically abutting against a face of the seal surface other than the sloping surface; and
      a dust lip provided on the small-diameter opening section, the dust lip being on an outer peripheral side of the small-diameter opening section closer to the knuckle than the seal lip, and a contact surface of the dust lip elastically abutting against the sloping surface,
      an axial length of the contact surface in contact with the sloping surface in a mounted state in which the dust cover has been attached to the seal surface is 0.5 mm to 1.0 mm such that a terminal end of the dust lip is positioned between the first end and the midpoint of the sloping surface.

2. The ball joint according to claim 1, wherein
   an axial length between the terminal end of the dust lip and a tip of the seal lip is 0.5 mm to 1.2 mm in the mounted state.

3. The ball joint according to claim 1, wherein
   the dust lip elastically abuts against the sloping surface which has a concavely curved sectional shape.

4. The ball joint according to claim 2, wherein
   the dust lip elastically abuts against the sloping surface which has a concavely curved sectional shape.

5. The ball joint according to claim 1, wherein
   the seal lip has a first ridge that elastically abuts against a concavely curved portion of the seal surface that continues to the sloping surface, and a second ridge that elastically abuts against a straight portion of the seal surface that extends straight from the curved portion.

6. The ball joint according to claim 5, wherein
   a base of the first ridge is spaced apart from a base of the dust lip.

7. The ball joint according to claim 6, wherein the base of the first ridge is spaced by at least 1.6 mm from the base of the dust lip.

8. The ball joint according to claim 2, wherein the seal lip has a first ridge that elastically abuts against a concavely curved portion of the seal surface that continues to the sloping surface, and a second ridge that elastically abuts against a straight portion of the seal surface that extends straight from the curved portion.

9. The ball joint according to claim 8, wherein a base of the first ridge is spaced apart from a base of the dust lip.

10. The ball joint according to claim 9, wherein the base of the first ridge is spaced by at least 1.6 mm from the base of the dust lip.

11. The ball joint according to claim 1, wherein the seal lip and the dust lip elastically abut against the seal surface which is formed integrally with the knuckle.

12. The ball joint according to claim 2, wherein the seal lip and the dust lip elastically abut against the seal surface which is formed integrally with the knuckle.

13. A ball joint comprising:
a socket;
a stud having a spherical head, the spherical head being coupled to the socket;
a knuckle attached to the stud, the knuckle having a seal surface that includes a cylindrical face transitioning to a radiused face transitioning to a sloped face, the sloped face including a first end proximate the radiused face, an opposite second end distal the radiused face, and a midpoint between the first end and the second end; and
a dust cover including:
    a cup-shaped film having a stud end and a socket end;
    a small opening at the stud end;
    a large opening at the socket end; and
    a sealing structure at the small opening, the sealing structure including a seal lip and a dust lip,
        the seal lip having:
            a first annular ridge configured to elastically abut against the cylindrical face;
            a second annular ridge configured to elastically abut against the cylindrical face; and
            a third annular ridge configured to elastically abut against the radiused face, and
        the dust lip being annular and configured to elastically abut against the sloped face, the dust lip having a contact surface in contact with the sloped face, an axial length of the contact surface in a mounted state in which the dust cover has been attached to the ball joint is 0.5 mm to 1.0 mm such that a terminal end of the dust lip is positioned between the first end and the midpoint of the sloped face.

14. The ball joint according to claim 13, wherein an axial length between the terminal end of the dust lip and a tip of the third ridge of the seal lip is 0.5 mm to 1.2 mm in the mounted state.

15. The ball joint according to claim 13, wherein a base of the third ridge is spaced apart from a base of the dust lip.

16. The ball joint according to claim 15, wherein the base of the third ridge is spaced by at least 1.6 mm from the base of the dust lip.

17. The ball joint according to claim 13, wherein the first and second ridges protrude radially relative to the small opening.

18. The ball joint according to claim 17, wherein the third ridge protrudes axially relative to the small opening.

19. The ball joint according to claim 17, wherein the dust lip protrudes axially relative to the small opening.

20. The ball joint according to claim 13, wherein the first and second ridges protrude radially relative to the small opening;
the third ridge protrudes axially relative to the small opening; and
the dust lip protrudes axially relative to the small opening.

* * * * *